(No Model.)
F. B. NICHOLS & C. THOMSON.
FISH DRYING HOUSE AND APPARATUS.
No. 250,382. Patented Dec. 6, 1881.
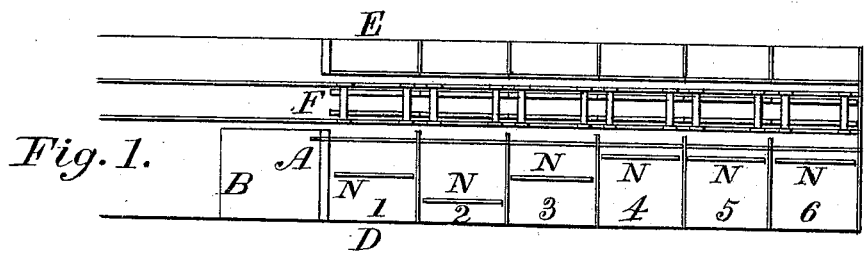
Fig. 1.
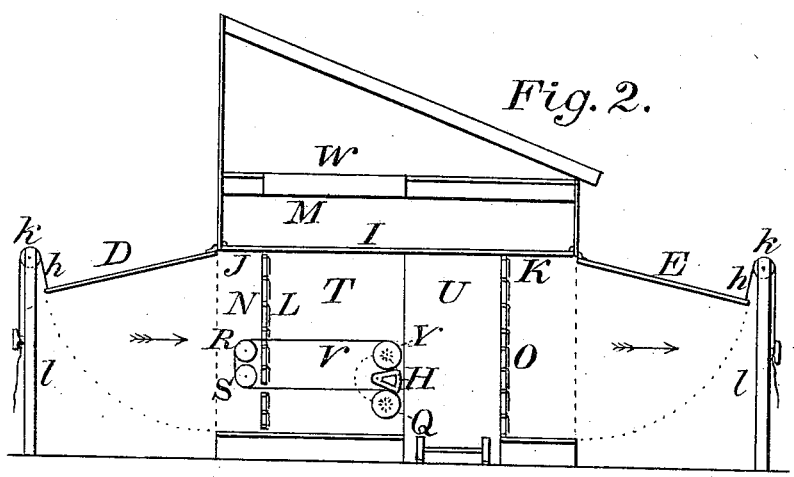
Fig. 2.
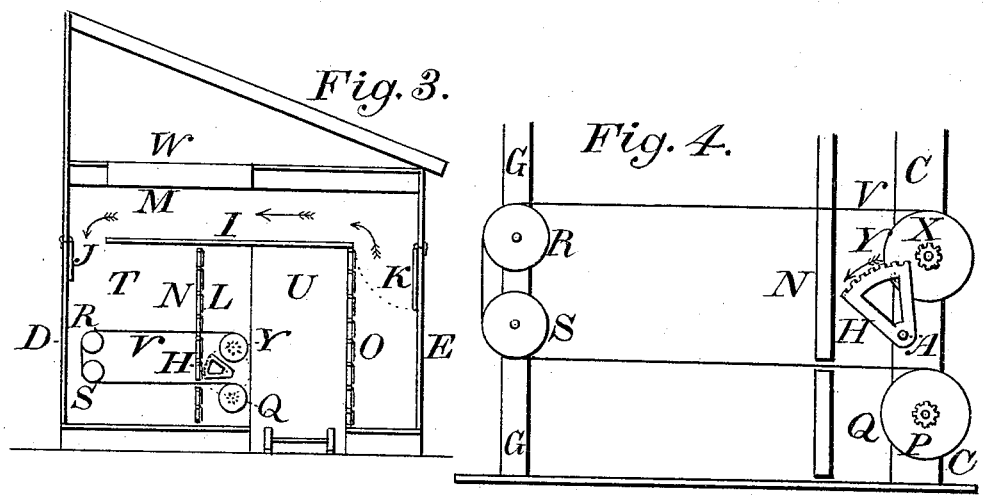
Fig. 3.
Fig. 4.
Witnesses:
David Boutilier
Inventors.
Frederic Booth Nichols,
Cathcart Thomson.

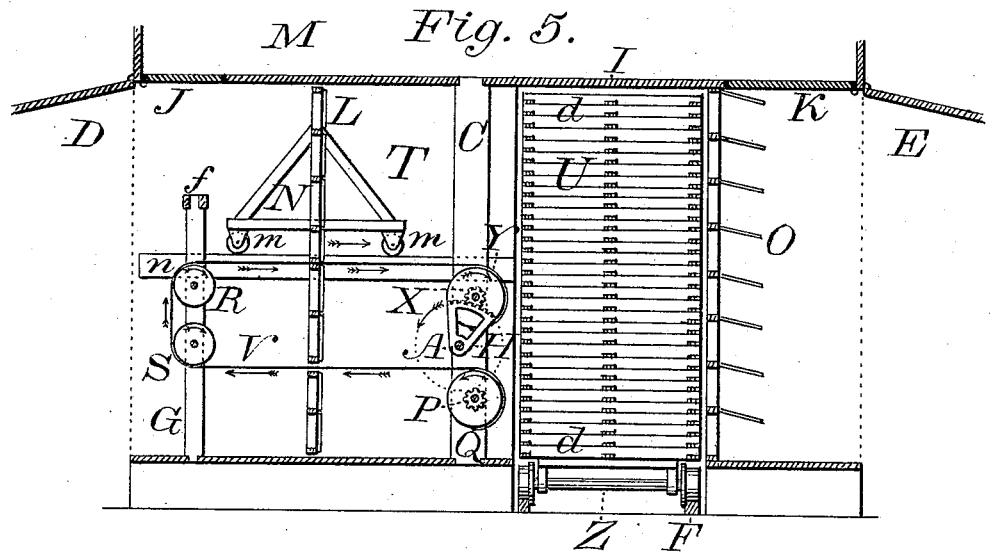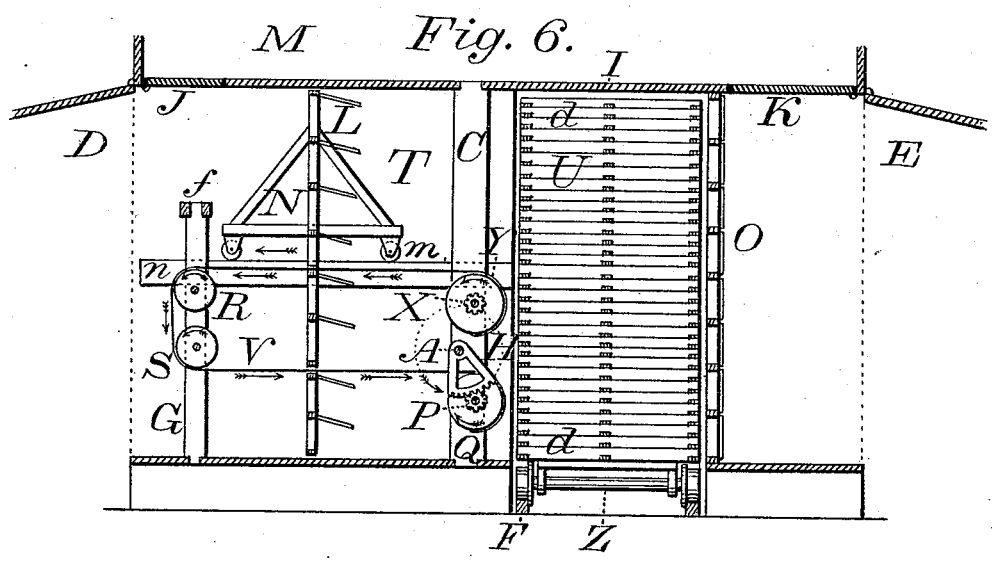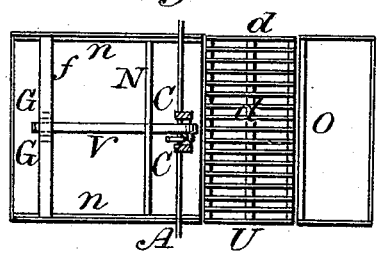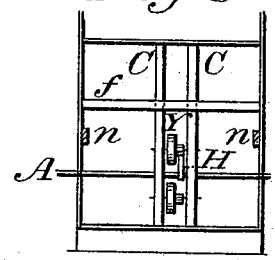

UNITED STATES PATENT OFFICE.

FREDERIC B. NICHOLS AND CATHCART THOMSON, OF HALIFAX, NOVA SCOTIA, CANADA.

FISH-DRYING HOUSE AND APPARATUS.

SPECIFICATION forming part of Letters Patent No. 250,382, dated December 6, 1881.

Application filed March 14, 1881. (No model.)

*To all whom it may concern:*

Be it known that we, FREDERIC BOOTH NICHOLS, a citizen of the United States, and CATHCART THOMSON, a subject of the Queen of Great Britain, both residing in the city and county of Halifax, in the Province of Nova Scotia, have invented certain new and useful Improvements in Fish-Drying Houses and Apparatus; and we do hereby declare that the following is a full, clear, and exact description of the invention, which will enable others skilled in the art to which it appertains to make and use the same.

Our invention relates to improvements in fish-drying houses and apparatus pertaining thereto, in which a piston-blower successively draws the external air in from one side of the building, forces it over the fish and out on the other side, when the atmosphere is in suitable condition for drying; but when loaded with moisture both the inlet and outlet are closed, communication being opened with a cooling-chamber overhead, the air contained in the drying and blowing chambers is forced over the fish, thence through the cooling-chamber and back again over the fish, and so on continuously, keeping the fish cool. We perform these operations by means of the apparatus and mechanism illustrated in the accompanying drawings, in which—

Figure 1 is a ground plan, on a reduced scale, showing a number of the drying and blowing chambers arranged side by side, with tramway and cars for holding and moving the "flakes" on which the fish are spread. Fig. 2 is a sectional elevation, showing the arrangement for drying. Fig. 3 is a corresponding section, showing the arrangement for keeping the fish cool. Fig. 4 is an enlarged vertical section of the mechanism for actuating the piston-blower. Fig. 5 is a sectional elevation, showing the piston-blower N going forward, with its valves L closed, forcing air through the spaces between the flakes $d\ d$ in chamber U and lifting the egress-valves O. Fig. 6 is a corresponding section, showing the piston-blower N on its backward movement, with valves L thrown open, admitting air into the chamber T, while valves O are closed. The arrows in Figs. 5 and 6 show the direction of motion of the several parts. Fig. 7 is a plan showing flake $d\ d$, uprights C C, cross-brace $f$ for uprights G G, and side pieces, $n\ n$, for the rollers $m$ of the blower N to run on. Fig. 8 is a transverse sectional elevation. Figs. 2, 3, 7, and 8 are on a scale double that of Fig. 1; Figs. 5 and 6 four times, and Fig. 4 six times, that of Fig. 1.

The drying-house consists of a series of chambers placed side by side, as seen in Fig. 1. Six is the most convenient number for a series, and if built of the size herein specified should have capacity sufficient to make one hundred quintals of dry-fish at one filling. The chambers should be eight feet high from floor to ceiling, eight feet from center to center of partitions, and sixteen feet long from one side of the building to the other. The partitions should extend from floor to ceiling, across the building from side to side, excepting a space of four feet four inches, where the tramway F is shown in Fig. 1. Each of the chambers has close-fitting doors D E at each end, that are hinged at the top and open outward. These are raised and held up in position, as seen in Fig. 2, by means of ropes $h\ h$, passing over pulleys $k\ k$ in posts $l\ l$, or they can be lowered to the position seen in Fig. 3 by the same means. A portion of the ceiling I is hinged at each end, so as to form the trap-doors J K. These are fastened up in position to form the continuous ceiling I, shutting off communication with the cooling-chamber M when doors D E are open, as in Fig. 2; but when, as in Fig. 3, the doors D E are closed J K are dropped down against the external doors, D E, opening a free passage for the air through the cooling-chamber M. Each chamber has a square piston-blower, N, made of light framework, with slats running horizontally, placed about one foot apart, for hinging the clapper-valves L, which should form nearly the whole surface of the blower. These clapper-valves should be formed of some flat substance light enough to lift readily with a slight pressure of air, and at the same time be stiff and strong enough to resist the back pressure when forcing the air forward over the fish. These valves open toward the fish, and are hinged with some flexible material—such as leather or cloth—to the horizontal strips of the frame; both upper and lower edges of the valves should lap onto the strips, but not onto each other. On each side of the blower-frame a strip of wood four feet long is fastened horizontally at right angles with the face of the valves, and braced from each side of the frame. These strips have rollers at each end that run on horizontal strips fastened to each side of the chamber, midway from floor to ceiling, and extending the whole length of the portion containing the blower and its actuating machinery.

The back or egress valves, O, are made in the same manner as the blower or ingress valves L, and are hinged on horizontal strips that are fastened to the partitions at the back of the compartment that contains the fish. These valves open outward with the pressure of air from the blower, letting the air pass freely through, closing, and preventing the return of damp air when the blower moves back to admit a fresh supply through its valves into the blowing-compartment.

A shaft, A, Fig. 1, runs from the engine-room B through the chambers, for the purpose of actuating the piston-blowers. Two upright pieces, C C, support the connecting mechanism. This mechanism consists of a segment of sixty degrees of a toothed wheel, H, of twelve inches radius to the pitch-line. This is fastened to the shaft A, which, in revolving in the direction of the arrow, alternately meshes in gear with pinion P, and after passing clear from P it gears with pinion X, and in passing around again gears with P and X, and so on continuously. These pinions should be four and one-eighth inches in diameter to the pitch-line, and each have a pulley of sixteen and three-eighths inches in diameter, and two or three inches face attached to them. These should turn freely on their axes in the frames formed by the upright pieces C C. Pulley Y has a belt, V, attached to its face. This belt passes on through the blower around guide-pulleys R and S, then back through the blower, and is attached to the face of pulley Q. Pulleys R and S turn on their axes in a frame formed by two upright pieces, G G. The belt should be of proper length so that when wound around pulley Y it is unwound from pulley Q, or vice versa. When the belt is wound around pulley Y the blower should be as far forward as it will come without encountering the revolving segmental gearing H. When in that position the belt direct from pulley Y is securely fastened to the blower, while the lower part of the belt that is attached to pulley Q passes freely through a hole in the blower. When the blower is in the position just mentioned the segmental gearing H in revolving meshes in gear with pinion P, rotating it and winding up the belt on pulley Q, at the same time unwinding it from pulley Y. This draws the blower rapidly back, the egress-valves at the back of the fish closing and preventing the return of damp air. At the same time the ingress-valves in the blower are thrown open and allow a fresh supply of external air to enter the chamber. After the blower has moved back it pauses an instant till the sectional gearing encounters pinion X, when by rotating it and pulley Y it winds up the belt on Y and unwinds it from Q. This draws the blower rapidly forward, closing its valves, and, forcing the comparatively dry air in a mass ahead, supplants the air that has become damp by contact with the fish by driving it out through the egress-valves into the external atmosphere. A longer pause then ensues before the blower is drawn back again for another blast. The piston-blower should fit the sides of the blowing-chamber T moderately close without rubbing against it, and should have four feet of stroke, which the above-mentioned dimensions of gearing and pulleys will accurately give. This insures the removal of all the air that has lain in contact with the fish at each stroke of the blower.

Each chamber is fitted alike with the exception that the sectional gearing is so placed as to drive each one in succession and not simultaneously, the advantages of which are apparent, the work performed being the same at all parts of the revolution of the shaft A. This is effected by the following arrangement: Commencing at chamber 1, Fig. 1, with the sectional gearing in position to drive the blower forward, the sectional gearing in chamber 2 would be fastened on shaft A sixty degrees behind that of 1 in its line of rotation, that in chamber 3 being sixty degrees behind 2, and so on in succession, each one being sixty degrees behind the preceding one. When arriving at chamber 6 the whole circuit would be completed. Then, turning back, 1 would be relatively sixty degrees behind 6. This, of course, will give a continuous succession of blasts as the shaft A revolves. When the blower in chamber 1 is going forward that in 2 is back at rest, ready to go forward the moment 1 has finished its stroke. In the meantime 3 is moving back and remains at rest while 2 is going forward, and so on in succession, so that when 6 is going forward 1 is back again at rest and 2 moving back.

It is obvious that if the number of chambers are increased or diminished the arc of the sectional gearing must be diminished or increased, in order to produce the same result of succession, and this would necessitate a like change in the pinions to produce the same length of stroke of the piston-blowers.

The cooling-chambers should be above the blowing and drying ones T U. The cooling-surfaces are formed by letting flat metal pans down from the floor above, their bottoms being even with the lower side of the floor-beams. These pans should only occupy the portion immediately over the blowers, as seen in Figs. 2 and 3, the other portion being sealed tight and the pans fastened to the beams in such a manner as to prevent the air from passing through.

The chambers should have about two feet of space between the top of the blowing and drying chambers and the bottoms of the pans.

The pans, when in use, can be filled with ice or some other refrigerating material; or in some cases a frequently-changing supply of cold water may be employed. Waste-pipes must be supplied to each pan, and a shallow pan should rest on top of the blowing-chamber of each compartment immediately below the ice-pans to catch any drip from condensed moisture, and should be provided with a waste-pipe.

The fish are spread out on flakes made of frame-work with cross-slats. These frames should be eight feet long by four feet wide, the short pieces forming the ends being three inches high, so as to extend above the slats and leave spaces between them when the flakes are piled one upon another. Each set of flakes, with fish spread on them, are piled on low-wheeled cars that run on the tramway, (shown in Fig. 1,) and being pushed into place, the ends formed by the high pieces that support each other, abutting on a line with the centers of the partitions of the chambers, leave spaces where the fish are, open from the blower to the valves behind. When all the compartments are filled with flakes spread with fish, the doors D E being open and J K closed, the shaft A is rotated at a rate of about one revolution in three seconds, moving each blower of the series forward in succession as above described, forcing about two hundred and fifty cubic feet of air over the fish in each compartment at one stroke of its blower. This amounts to thirty thousand cubic feet of air per minute for the series of six, or one million eight hundred thousand cubic feet per hour. The forcing of this enormous bulk of air can be effected with a moderate amount of power by the method herein specified, and when the air is not loaded with moisture the fish dry with great rapidity; but there are many days during the fishing season when the air is too damp to effect any drying, and at a temperature so high as to soon spoil the fish. To provide against this the cooling-chamber is brought into requisition by filling the pans W with ice or other cooling material before mentioned, shutting the external doors, D E, and opening the trap-doors J K, and running the blowers very slow, not exceeding one-quarter the speed used in drying. This soon brings the temperature of the air contained in the chambers low enough to insure the preservation of the fish until the external air is in suitable condition to resume the drying. The temperature need not be lower than 50° Fahrenheit.

It is obvious that this method would be suitable for drying other things besides fish; therefore we do not confine ourselves to fish alone, but claim, broadly, its application to the drying of any substances that it is suitable for. When applied for drying other substances than fish its dimensions could in many cases be diminished to very moderate or even minute proportions without affecting the principle of its construction and operation.

We claim as our invention—

1. The piston-blower N, with its ingress-valves L moving back and forth in chamber T, and egress-valves O external to the drying-chamber U, in which the high pieces forming the ends of the flakes d d, resting one on another, form the partitions dividing the space at F into a series of chambers, said flakes resting on car Z, which moves on tramway F for the purpose of supplying and removing material and adjusting the flakes to form partitions corresponding with the partitions forming chambers T, all in combination for the purpose specified.

2. The combination of the revolving segmental gearing H with pinions P X and their attached pulleys Q Y, having belt V fastened to them and passing over guide-pulleys R S, all working in combination with the piston-blower N, substantially in the manner and for the purpose specified.

3. Segmental toothed gearings H, attached to the shaft A in such a manner that each succeeding piece of gearing will be the same number of degrees behind the preceding one as is occupied by their arcs, and gearing with pinions P X, in combination with blowers N of the series of chambers to force successive blasts of air over the fish or other material placed in the drying-chambers U, all in the manner and for the purpose herein specified.

4. The external doors, D E, in combination with the blowing and drying chambers T U, internal trap-doors, J K, and cooling-chamber M, for the purpose of either forcing blasts of external drying-air in through the opening at D and out of the opening at E, or by closing doors D E and opening trap-doors J K to circulate the air contained in the chambers free from damp external air and keep the fish cool, all substantially in the manner and for the purpose specified.

FREDERIC BOOTH NICHOLS.
CATHCART THOMSON.

Witnesses:
JOHN WHITE,
DAVID BOUTILIER.